(12) United States Patent
Gordon

(10) Patent No.: US 11,981,159 B2
(45) Date of Patent: May 14, 2024

(54) BEAD-LOCKING WHEEL

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 513 days.

(21) Appl. No.: 17/019,145

(22) Filed: Sep. 11, 2020

(65) Prior Publication Data
US 2021/0070101 A1    Mar. 11, 2021

Related U.S. Application Data

(60) Provisional application No. 62/899,049, filed on Sep. 11, 2019.

(51) Int. Cl.
*B60B 25/04*   (2006.01)
*B60B 25/10*   (2006.01)
*B60B 25/20*   (2006.01)

(52) U.S. Cl.
CPC .............. *B60B 25/04* (2013.01); *B60B 25/10* (2013.01); *B60B 25/20* (2013.01); *B60B 2320/10* (2013.01)

(58) Field of Classification Search
CPC ......... B60B 25/04; B60B 25/10; B60B 25/12; B60B 25/20
See application file for complete search history.

(56) References Cited

U.S. PATENT DOCUMENTS

| | | | | |
|---|---|---|---|---|
| 2,868,260 A * | 1/1959 | Powers | ................. | B60B 25/04 D12/208 |
| 3,283,800 A * | 11/1966 | Ischinger | ............... | B60B 25/04 152/397 |
| 4,505,314 A * | 3/1985 | Goudy | ................... | B60B 21/10 152/398 |
| 4,989,657 A * | 2/1991 | Lipper | .................. | B60B 25/04 301/9.1 |
| 9,481,205 B2 * | 11/2016 | Rider | .................... | B60B 21/125 |
| 10,953,691 B2 * | 3/2021 | Buck | ...................... | B60B 25/10 |

* cited by examiner

*Primary Examiner* — Jason R Bellinger
(74) *Attorney, Agent, or Firm* — Barry Choobin; Patent 360

(57) ABSTRACT

An apparatus and methods are provided for a bead-locking wheel for mechanically coupling a tire to a wheel rim of an off-road vehicle. The bead-locking wheel includes a barrel for mounting the tire and a bead lock face for fastening the barrel and tire to a wheel hub of the vehicle. The bead lock face is fastened to a shoulder disposed around an outboard end of the barrel. The shoulder and an outboard flange of the barrel cooperate with a periphery of the bead lock face to mechanically retain an outboard bead of the tire. Mechanically retaining the outboard bead facilitates a relatively low inflation pressure within the tire to accommodate off-road conditions and high tractive forces. The bead lock face maximizes a positive offset and backspacing of the bead-locking wheel to accommodate a relatively wide hub and spindle assembly while maintaining an advantageous steering geometry and track width.

19 Claims, 6 Drawing Sheets

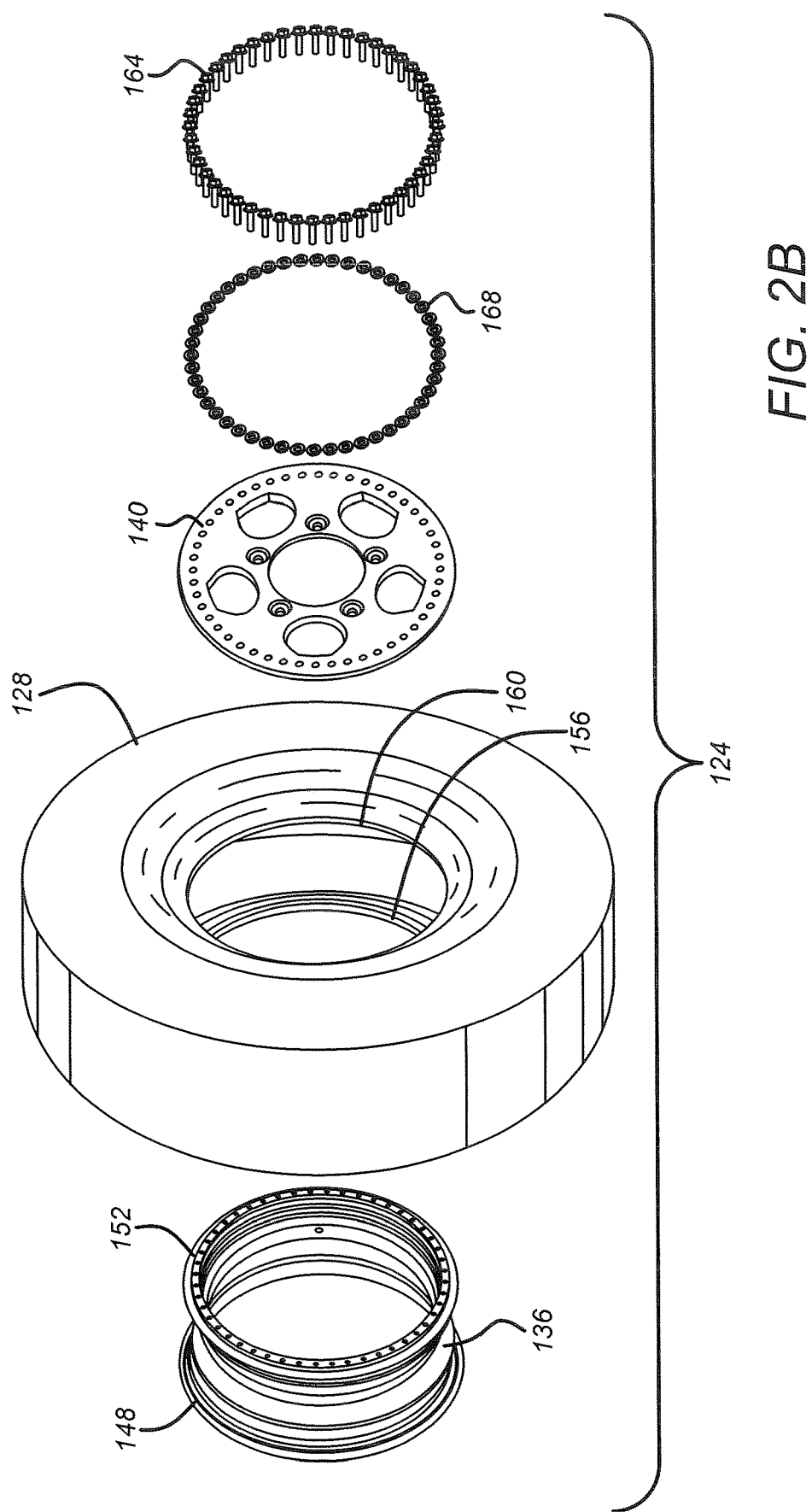

BEAD-LOCKING WHEEL

PRIORITY

This application claims the benefit of and priority to U.S. Provisional Application, entitled "Bead-Locking Wheel," filed on Sep. 11, 2019 and having application Ser. No. 62/899,049, the entirety of said application being incorporated herein by reference.

FIELD

Embodiments of the present disclosure generally relate to the field of vehicle suspension systems. More specifically, embodiments of the disclosure relate to an apparatus and methods for a bead-locking wheel configured to mechanically couple a tire to a wheel rim to improve performance and handling of off-road vehicles.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. A conventional wheel generally includes a tire mounted onto a wheel rim that includes a wheel plate and a barrel. Typically, the tire is pulled onto the wheel rim and fixed laterally thereon by flanges comprising the wheel rim on which beads of the tire bear. In general, the wheel and tire are mounted onto the vehicle by fastening the wheel plate to a wheel hub of the vehicle.

The use of higher clearance, higher traction vehicles enables off-road vehicles to access trails and roads having rough, low traction surfaces that may not be traversed using a standard, on-road vehicle. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A frame comprised of multiple structural members with attached doors is configured to protect the occupants in the event of a rollover situation. Given that off-road vehicles routinely operated over very rough terrain, such as mountainous regions, there is a desire to improve the safety, convenience, and comfort of off-road vehicles, while at the same improving the performance and handling of such vehicles.

SUMMARY

An apparatus and methods are provided for a bead-locking wheel for mechanically coupling a tire to a wheel rim of an off-road vehicle. The bead-locking wheel includes a barrel for mounting the tire and a bead lock face for fastening the barrel and tire to a wheel hub of the vehicle. The bead lock face is fastened to a shoulder disposed around an outboard end of the barrel. The shoulder and an outboard flange of the barrel are configured to cooperate with a periphery of the bead lock face to mechanically retain an outboard bead of the tire. Mechanically retaining the outboard bead facilitates a relatively low inflation pressure within the tire to accommodate off-road conditions and high tractive forces. The bead lock face is configured to maximize a positive offset and backspacing of the bead-locking wheel to accommodate a relatively wide hub and spindle assembly while maintaining an advantageous steering geometry and track width.

In an exemplary embodiment, a bead-locking wheel for a vehicle comprises: a barrel for mounting a tire; a bead lock face for fastening the barrel to a wheel hub of a vehicle; an inboard flange of the barrel for retaining an inboard bead of the tire; and an outboard flange of the barrel for fastening an outboard bead of the tire to the barrel.

In another exemplary embodiment, the inboard flange is configured to retain the inboard bead by way of outward force on the inboard flange by the inboard bead due to inflation pressure within an interior of the tire. In another exemplary embodiment, the barrel further comprises a shoulder adjacent to the outboard flange and configured to cooperate with the outboard flange and a periphery of the bead lock face to fasten the outboard bead to the barrel. In another exemplary embodiment, the periphery is configured to cooperate with the outboard flange and the shoulder to form a recess that mechanically retains the outboard bead. In another exemplary embodiment, the recess is configured to facilitate a relatively low inflation pressure within the tire. In another exemplary embodiment, the shoulder includes a multiplicity of threaded holes configured to receive a multiplicity of fasteners for attaching the bead lock face to the barrel.

In another exemplary embodiment, the bead lock face includes a multiplicity of holes disposed around a periphery of the bead lock face and aligned with threaded holes disposed around the barrel adjacent to the outboard flange. In another exemplary embodiment, the bead-locking wheel further comprises a multiplicity of fasteners configured to extend through the multiplicity of holes and threadably engage with the threaded holes for fastening the bead lock face to the barrel. In another exemplary embodiment, any one or more of the multiplicity of fasteners includes a bolt and a washer.

In another exemplary embodiment, the bead lock face includes multiple stud through holes configured to receive studs comprising the wheel hub. In another exemplary embodiment, each of the multiple stud through holes is configured to seat a lug nut for fastening the bead lock face to the wheel hub. In another exemplary embodiment, the bead lock face comprises a disc-shaped member configured to be fastened to a shoulder disposed around an outboard end of the barrel. In another exemplary embodiment, the disc-shaped member is configured to maximize a positive offset and backspacing of the bead-locking wheel. In another exemplary embodiment, the disc-shaped member is configured to facilitate coupling the bead-locking wheel to a relatively wide hub and spindle assembly while maintaining an advantageous steering geometry and track width.

In an exemplary embodiment, a method for a bead-locking wheel for a vehicle comprises: mounting a tire on a barrel; contacting an inboard bead of tire against an inboard flange of the barrel; seating an outboard bead of the tire on a shoulder disposed around a circumference of the barrel; retaining the outboard bead between an outboard flange of the barrel and a periphery of a bead lock face; aligning a multiplicity of holes in the periphery with a multiplicity of threaded holes disposed around the shoulder; engaging a multiplicity of fasteners with the multiplicity of threaded holes to couple the bead lock face to the barrel; and mounting the bead lock face onto a wheel hub of the vehicle.

In another exemplary embodiment, the method further comprises inflating the tire to a desired internal pressure. In another exemplary embodiment, inflating includes using a relatively low inflation pressure within the tire to accommodate off-road conditions and other conditions involving high tractive forces, such as during accelerating or braking. In another exemplary embodiment, mounting the bead lock face includes extending studs comprising the wheel hub through stud through holes disposed in the bead lock face. In another exemplary embodiment, mounting the bead lock face includes tightening lug nuts onto the studs to fix the bead lock face to the wheel hub. In another exemplary embodiment, aligning includes concentrically coupling the bead lock face with the barrel. In another exemplary embodiment, engaging includes tightening the multiplicity of fasteners to retain the outboard bead between outboard flange and the periphery.

BRIEF DESCRIPTION OF THE DRAWINGS

The drawings refer to embodiments of the present disclosure in which:

FIG. 2B illustrates an isometric exploded view of the bead-locking wheel and tire assembly of FIG. 2A;

Figure 1:
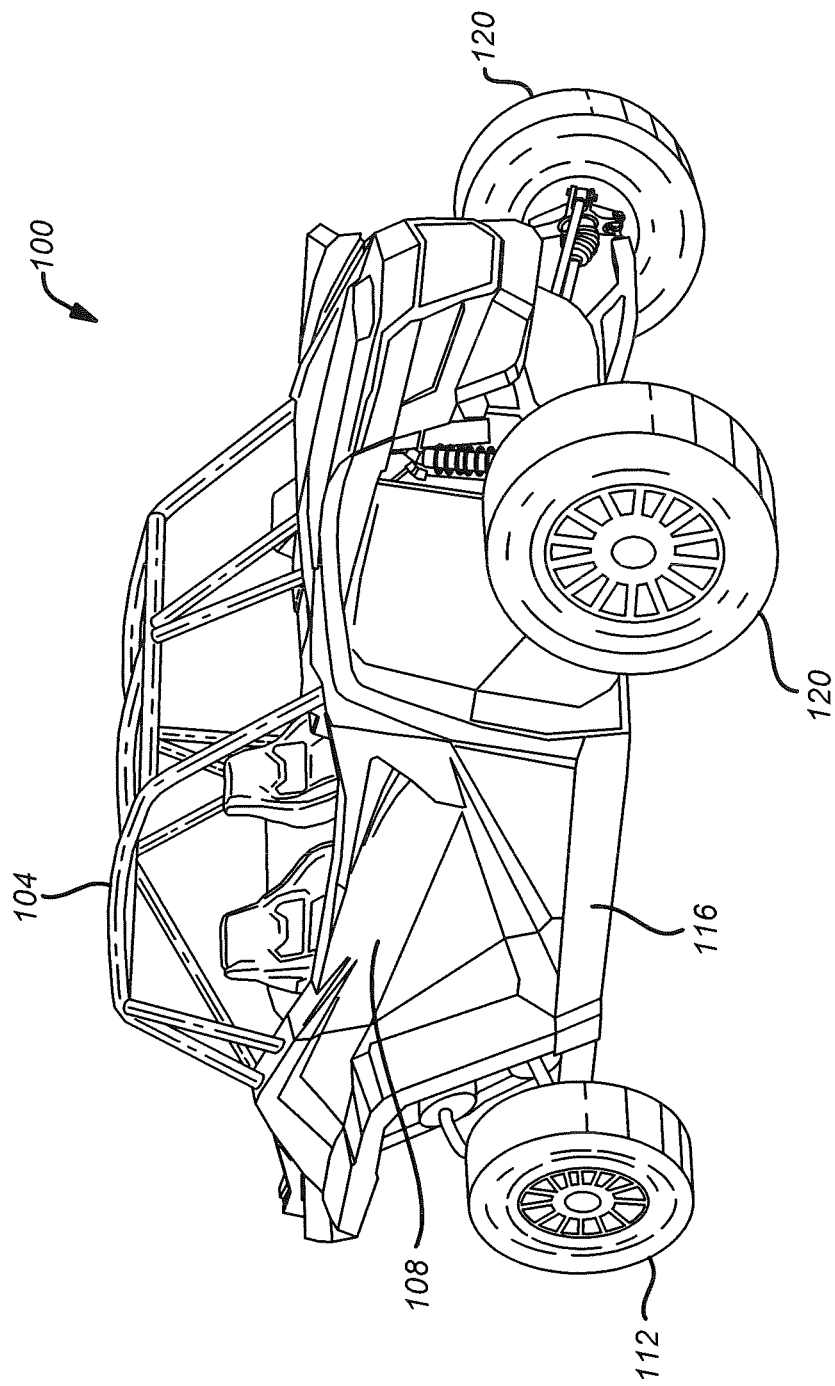
FIG. 1 illustrates an exemplary embodiment of an off-road vehicle that is particularly suitable for implementation of a bead-locking wheel in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first plate," may be made. However, the specific numeric reference should not be interpreted as a literal sequential order but rather interpreted that the "first plate" is different than a "second plate." Thus, the specific details set forth are merely exemplary. The specific details may be varied from and still be contemplated to be within the spirit and scope of the present disclosure. The team "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, off-road vehicles often are operated to access trails and travel over roads having rough, low traction surfaces that may not be traversed using a standard, on-road vehicle. As such, off-road vehicles typically comprise larger wheels, wider tires, and suspension configurations that are specifically engineered for use in off-road applications. A conventional wheel generally includes a tire mounted onto a wheel rim that includes a wheel plate and a barrel. Typically, the tire is pulled onto the wheel rim and fixed laterally thereon by flanges comprising the wheel rim on which beads of the tire bear. The wheel and tire are mounted onto the vehicle by fastening the wheel plate to a wheel hub of the vehicle. Given that off-road vehicles routinely operated over very rough terrain, such as mountainous regions, there is a desire to improve the safety, convenience, and comfort of off-road vehicles, while at the same improving the performance and handling of such vehicles. Embodiments of the disclosure provide to an apparatus and methods for a bead-locking wheel that mechanically couples a tire to a wheel rim to improve performance, handling and safety of off-road vehicles.

FIG. 1 shows an off-road vehicle 100 that is particularly suitable for implementation of a bead-locking wheel in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of a front suspension system. The bead-locking wheel disclosed herein may be incorporated into any one more of the front and rear wheels 120, 112, without limitation. It should be understood, however, that the bead-locking wheel disclosed herein is not to be limited to the off-road vehicle 100, but rather the bead-locking wheel may be incorporated into a wide variety of vehicles, other than UTVs, without limitation.

Figure 2A:
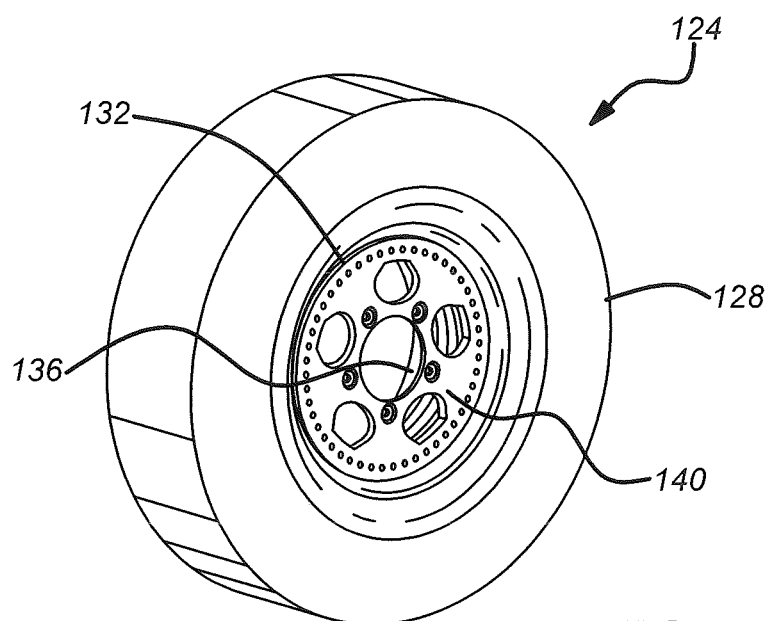
FIG. 2A illustrates an isometric view of an exemplary embodiment of a bead-locking wheel and tire assembly for a vehicle, in accordance with the present disclosure.

FIG. 2A illustrates an isometric view of an exemplary embodiment of a bead-locking wheel and tire assembly 124 for a vehicle, such as the off-road vehicle 100. The assembly 124 comprises a tire 128 that is mounted onto a bead-locking wheel 132, in accordance with the present disclosure. The bead-locking wheel 132 includes a barrel 136 for supporting the tire 128 and a bead lock face 140 for fastening the barrel 136 to a wheel hub 144 (see FIG. 6) of the vehicle 100. As best shown in FIG. 2B, the barrel 136 is a cylindrical member having an inboard flange 148 and an outboard flange 152 for respectively retaining an inboard bead 156 and an outboard bead 160 of the tire 128. The bead lock face 140 is a disc-shaped member that may be coupled with the barrel 136 by way of suitable fasteners. In the illustrated embodiment, the fasteners comprise a multiplicity of bolts 164 and washers 168. It is contemplated, however, that in other embodiments, any of various suitable fasteners may be used to couple the bead lock face 140 to the barrel 136, without limitation.

Figure 3A:
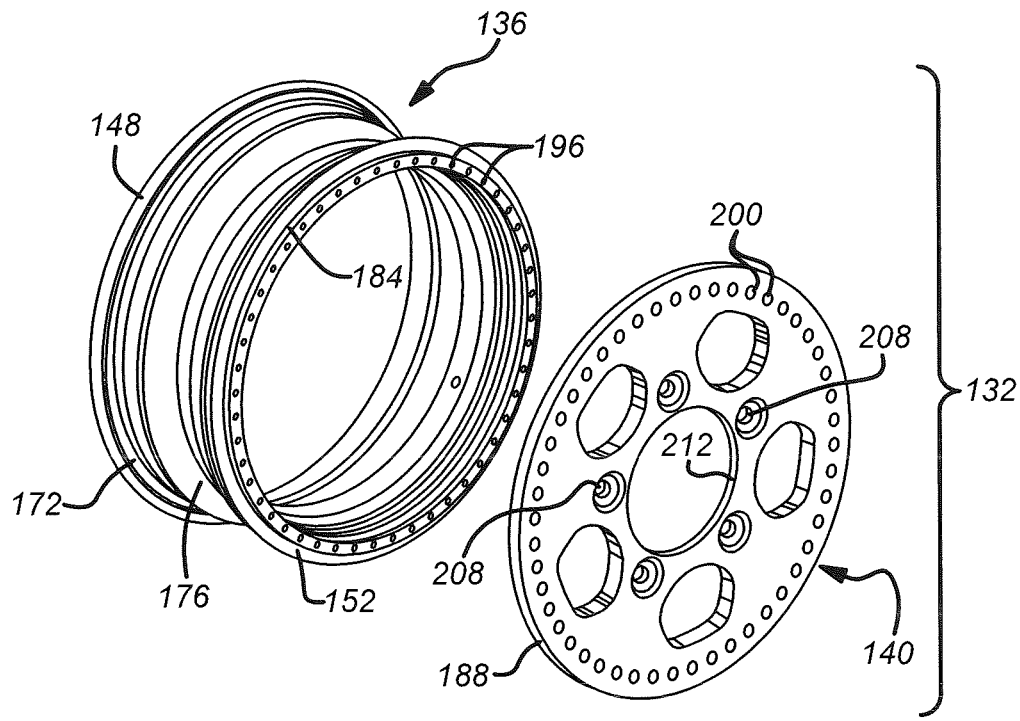
FIG. 3A illustrates a front isometric exploded view of an exemplary embodiment of a bead-locking wheel in absence of a tire.
Figure 3B:
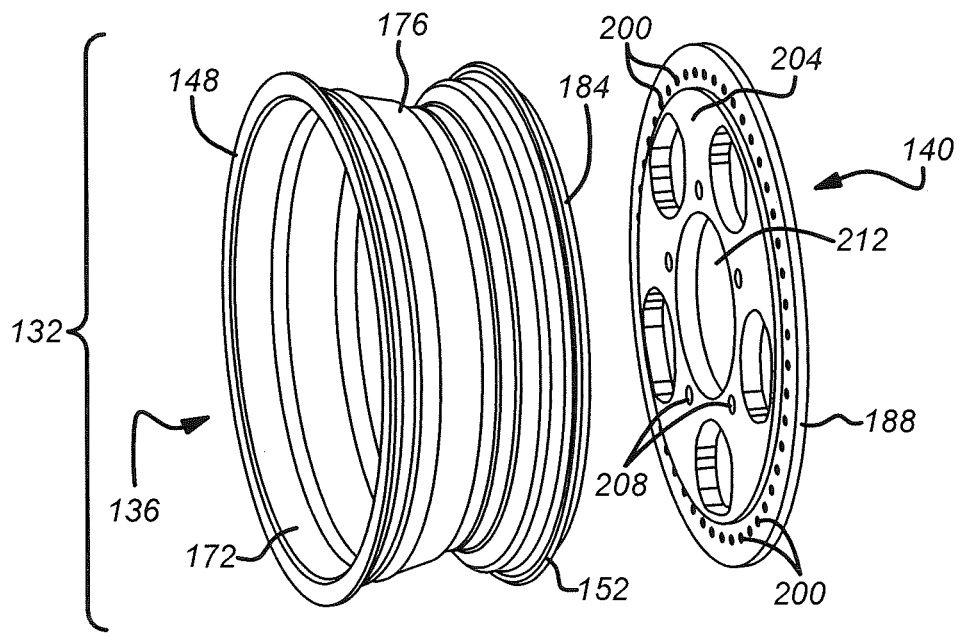
FIG. 3B illustrates a rear isometric exploded view of the bead-locking wheel of FIG. 3A.

FIGS. 3A and 3B illustrate isometric exploded views of the bead-locking wheel 132 in absence of the tire 128. As shown, the barrel 136 generally comprises an inboard rim 172 that is coupled with an outboard rim 176. In the illustrated embodiment, the inboard rim 172 and the outboard rim 176 are welded to form the barrel 136 as a single component. As will be recognized, manufacturing the inboard rim 172 and the outboard rim 176 separately before joining them to form a single component generally simplifies forming the barrel 136. It is contemplated, however, that the inboard rim 172 and the outboard rim 176 may be joined by means other than welding, without straying beyond the scope of the present disclosure.

Figure 5:
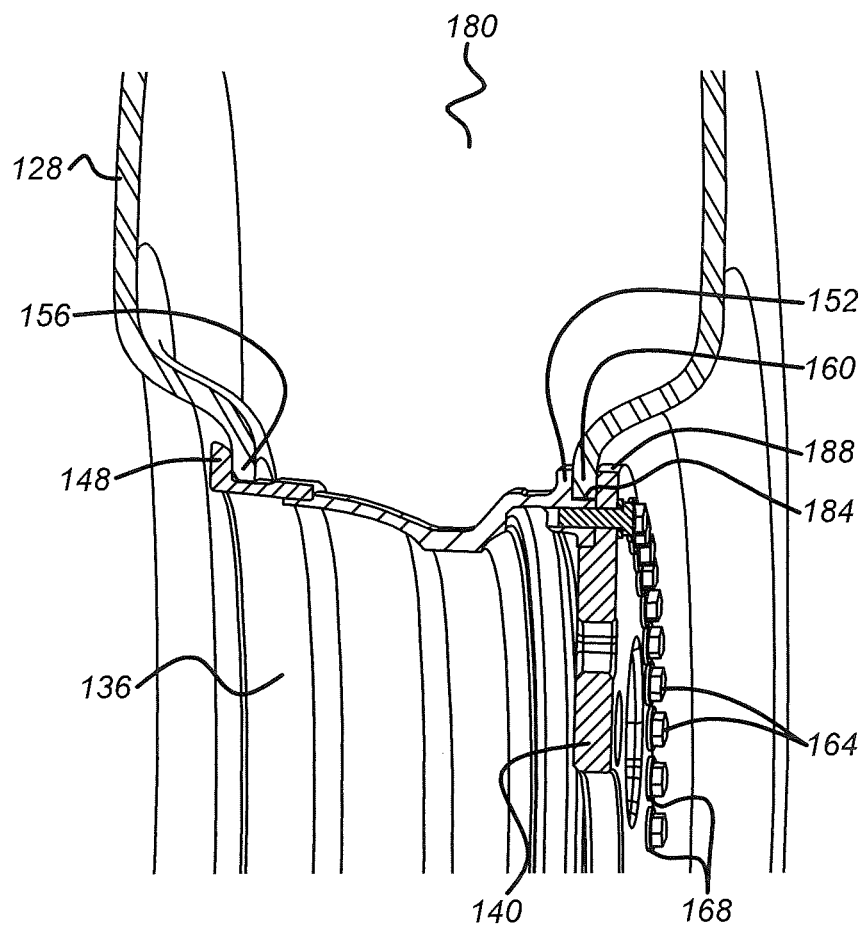
FIG. 5 illustrates a cross-sectional view of a tire mounted onto an exemplary embodiment of a bead-locking wheel.

As shown in FIGS. 3A and 3B, the inboard flange 148 and the outboard flange 152 are disposed at opposite ends of the barrel 136. The inboard flange 148 is configured for retaining the inboard bead 156 of the tire 128. As best illustrated in FIG. 5, once the tire 128 is inflated, the inboard bead 156 presses against the inboard flange 148. The inboard flange 148 retains the inboard bead 156 by way of an outward force on the inboard flange 148 by the inboard bead 156 due to inflation pressure within an interior 180 of the tire 128.

Figure 4A:
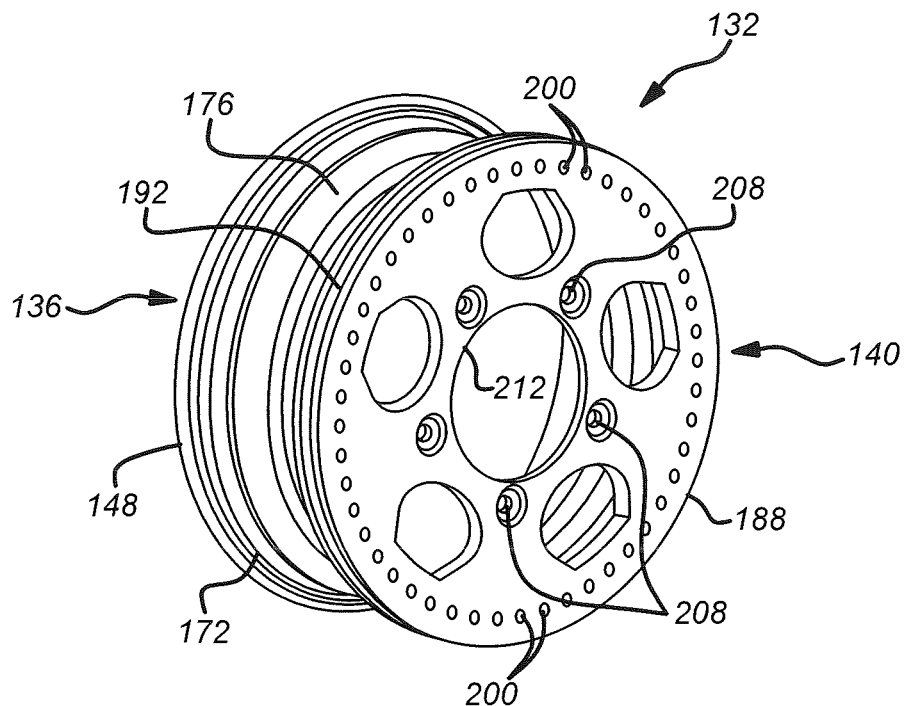
FIG. 4A illustrates a front isometric view of an exemplary embodiment of a bead-locking wheel in absence of a tire.
Figure 4B:
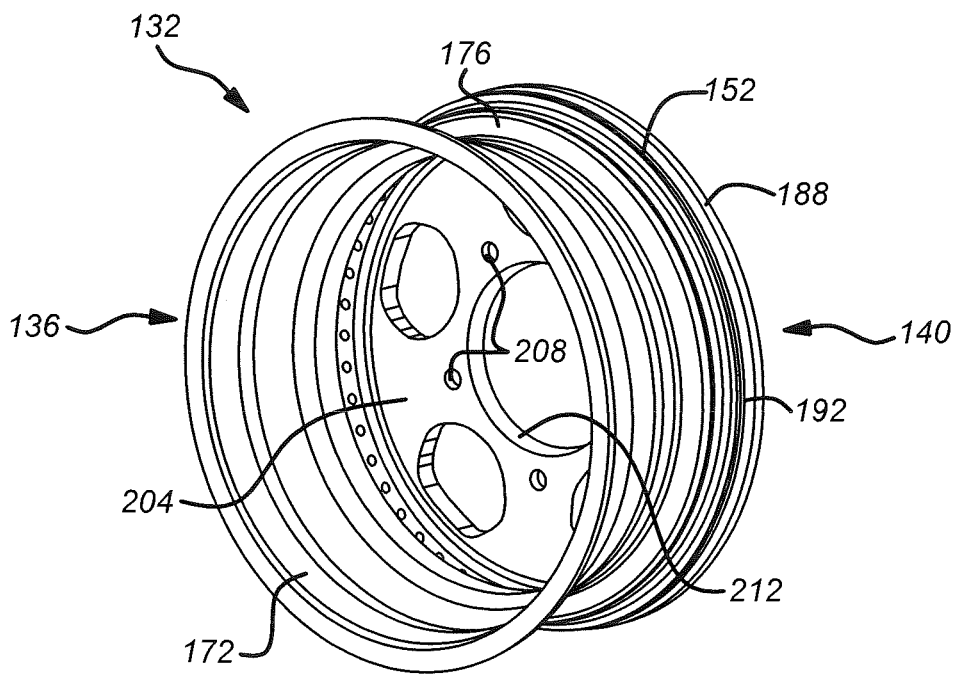
FIG. 4B illustrates a rear isometric view of the bead-locking wheel of FIG. 4A.

With continuing reference to FIGS. 3A and 3B, the outboard flange 152 is configured to contribute to fastening the outboard bead 160 to the barrel 136. The barrel 136 includes a shoulder 184 disposed around the circumference of the barrel 136 adjacent to the outboard flange 152. As shown in FIGS. 4A and 4B, once the bead lock face 140 is installed onto the barrel 136, a periphery 188 of the bead lock face 140 cooperates with the outboard flange 160 and the shoulder 184 to form a recess 192 that extends around the circumference of the barrel 136.

The recess 192 is configured to mechanically retain the outboard bead 160, as shown in FIG. 5. To this end, the shoulder 184 includes a multiplicity of threaded holes 196 that are configured to threadably receive a multiplicity of fasteners, such as the bolts 164 and washers 168 shown in FIG. 2B, and the bead lock face 140 includes a multiplicity of through-holes 200 disposed around the periphery 188. The through-holes 200 may be aligned with the threaded holes 196 upon concentrically coupling the bead lock face 140 with the barrel 136 as shown in FIGS. 4A and 4B. As will be appreciated, the bead lock face 140 may be fastened to the barrel 136 by inserting the bolts 164 through the holes 200 and threadably engaging the bolts with the threaded holes 196.

Once the tire 128 is installed onto the barrel 136 as shown in FIG. 5, the outboard bead 160 seats on the shoulder 184 and presses against the outboard flange 152. The shoulder 184 ensures that the outboard bead 160 is concentric with the barrel 136. Once the bead lock face 140 is fastened onto the barrel 136, as described above, the periphery 188 and the outboard flange 152 cooperate with the shoulder 184 to mechanically fasten the outboard bead 160 to the barrel 136. It should be understood, therefore, that unlike conventional barrels that rely strictly on tire inflation pressure to retain the outboard bead 160 in contact with the outboard flange, the recess 192 facilitates a relatively low inflation pressure within the tire 128 due to the outboard bead 160 being sandwiched between the outboard flange 152 and the periphery 188. Experimental observation has demonstrated that using a relatively low inflation pressure within the tire 128 advantageously accommodates off-road conditions and other conditions involving high tractive forces, such as during accelerating or braking.

As disclosed hereinabove, the bead lock face 140 generally is a disc-shaped member that is configured to be coupled with the barrel 136 by way of suitable fasteners, such as the bolts 164 and washers 168. As best shown in FIG. 3B, the bead lock face 140 includes a thin cylindrical portion 204 that is surrounded by the above-discussed periphery 188. The cylindrical portion 204 includes a diameter that is configured to fit within the shoulder 184 of the barrel 136, as shown in FIG. 4B. As will be appreciated, the cylindrical portion 204 is configured to provide structural integrity to the bead lock face 140, as well as to ensure that the bead lock face 140 couples with the shoulder 184 concentrically once the bead lock face 140 is placed onto the barrel 136. It is contemplated that the cylindrical portion 204 further assists with aligning the through holes 200 with the threaded holes 196 during installing a tire onto the bead-locking wheel 132.

Figure 6:
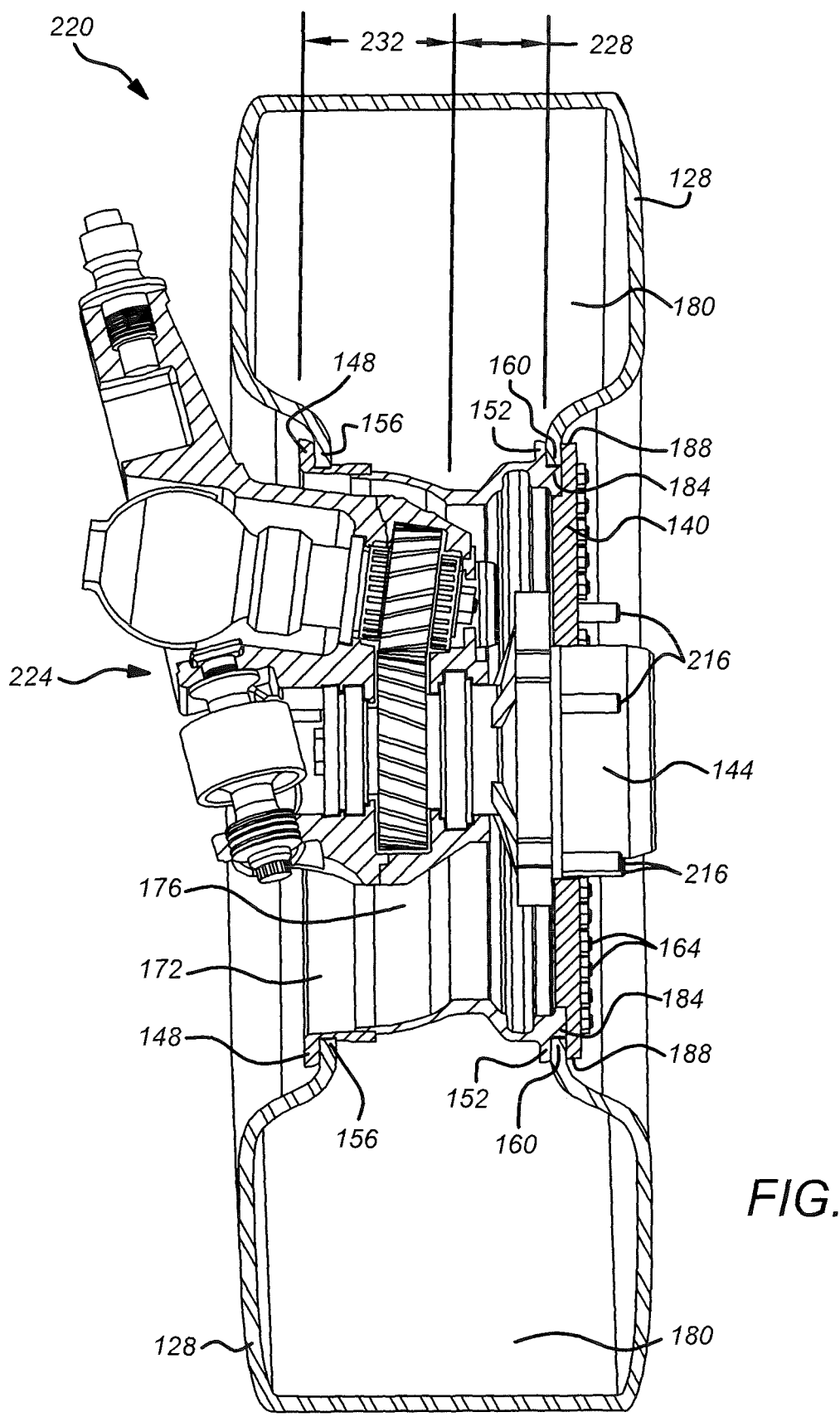
FIG. 6 illustrates a cross-sectional view of an exemplary-use environment wherein a bead-locking wheel and a tire are installed onto an exemplary front spindle assembly, according to the present disclosure.

As shown in FIGS. 3A through 4B, the bead lock face 140 includes multiple stud through-holes 208 arranged uniformly around a central opening 212. The central opening 212 is configured to allow the wheel hub 144 to protrude beyond the bead lock face 140, as shown in FIG. 6. Similarly, the stud through holes 208 are configured to allow passage of studs 216 comprising the wheel hub 144, as shown in FIG. 6. Further, each of the stud through-holes 208 is configured to seat a lug nut for fastening the bead lock face 140 to the wheel hub 144. In the illustrated embodiment, the stud through-holes 208 are each countersunk for seating a lug nut. It is contemplated, however, that the stud through-holes 208 may include any of various seat configurations, such as conical seats, spherical seats, Mag seats, and the like, without limitation. Moreover, in the illustrated embodiment of FIGS. 3A-4B, the bead lock face 140 includes five stud through-holes 208, although in other embodiments the number of stud through-holes 208 will depend on the number of studs 216 comprising the wheel hub 144, without limitation.

Turning specifically to FIG. 6, an exemplary-use environment 220 is illustrated in cross-section, wherein the bead-locking wheel 132 of FIGS. 3A-4B and the tire 128 are installed onto an exemplary front spindle assembly 224. In the environment 220 of FIG. 6, the tire 128 is installed onto the bead-locking wheel 132 as described hereinabove. Further, the bead-locking wheel 132 is installed onto the wheel hub 144. The wheel hub 144 and the studs 216 protrude beyond the bead lock face 140. As described hereinabove, the disc-shaped bead lock face 140 is configured to maximize a positive offset 228 and a backspacing 232 of the bead-locking wheel 132. Experimental observation has demonstrated that bead lock face 140 of the present disclosure facilitates coupling the bead-locking wheel 132 to a relatively wide wheel hub and spindle assembly while maintaining an advantageous steering geometry and track width. In the illustrated embodiment of FIG. 6, the front spindle assembly 124 is of a variety that includes internal gears, and thus the front spindle assembly 124 generally is wider and taller than spindles lacking gears. As will be appreciated, the positive offset 228 and backspacing 232 provided by the bead-locking wheel 132 are well suited to accommodate the size of the front spindle assembly 124 without compromising steering geometry and track width.

Methods for a bead-locking wheel 132 for a vehicle 100 may include, in some embodiments, mounting a tire 128 on a barrel 136 comprising a bead-locking wheel 132. In some embodiments, the methods include contacting an inboard bead 156 of tire 128 against an inboard flange 148 of the barrel 136. An outboard bead 160 of the tire 128 may, in some embodiments, be seated on a shoulder 184 disposed around a circumference of the barrel 136. Further, the outboard bead 160 may be pressed against an outboard flange 152 disposed adjacent to the shoulder 184 of the barrel 136.

The methods may further include, in some embodiments, retaining the outboard bead 160 between the outboard flange 152 of the barrel 136 and a periphery 188 of the bead lock face 140. In some embodiments, the methods include concentrically coupling the bead lock face 140 with the barrel 136. In some embodiments, a multiplicity of through-holes 200 disposed around the periphery 188 of the bead lock face 140 may be aligned with a multiplicity of threaded holes 196 disposed around the shoulder 184. Further, the methods may, in some embodiments, include inserting fasteners through the holes 200 and engaging fasteners with the threaded holes 196 to fasten the bead lock face 140 to the barrel 136. In some embodiments, the fasteners may comprise bolts 164 and washers 168. The methods may include, in some embodiments, tightening the fasteners to retain the outboard bead 160 between outboard flange 152 and the periphery 188.

In some embodiments, the methods may include inflating the tire 128 to a desired internal pressure. The methods may include, in some embodiments, using internal pressure within the tire 128 to press the inboard bead 156 against the inboard flange 148 to maintain inflation of the tire 128. In some embodiments, the methods may include using a relatively low inflation pressure within the tire 128 that advantageously accommodates off-road conditions and other conditions involving high tractive forces, such as during accelerating or braking.

The methods may include mounting the bead lock face 140 onto a wheel hub 144 of the vehicle 100. In some embodiments, mounting the bead lock face 140 includes extending studs 216 comprising the wheel hub 144 through stud through-holes 208 disposed in the bead lock face 140. Further, the methods may, in some embodiments, include tightening lug nuts onto the studs 216 to fix the bead lock face 140 to the wheel hub 144.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A bead-locking wheel for a vehicle, comprising:
   a barrel for mounting a tire, the barrel of a cylindrical profile;
   a bead lock face for fastening the barrel to a wheel hub of a vehicle, the bead lock face of a disc-shaped planar profile having an inner face and an outer face, the bead lock face has a central portion and a circumferential portion, the central portion at the inner face is thicker than the circumferential portion and is of a cylindrical profile, wherein a side surface of the central portion and an inner surface of the circumferential portion form a right-angled step, the circumferential portion has multiple through-holes arranged radially and spaced apart from each other;
   an inboard flange of the barrel for retaining an inboard bead of the tire;
   an outboard flange of the barrel for retaining an outboard bead of the tire;
   a shoulder disposed around a circumference of the barrel, the shoulder disposed adjacent to the outboard flange, wherein a shape of the shoulder corresponds with a shape of the right-angled step so that the right-angled step juxtaposes with a side and a bottom portion of the shoulder, wherein the shoulder has multiplicity of threaded holes, wherein positions of the multiplicity of threaded holes correspond to positions of the multiple through-holes of the circumferential portion; and
   a recess formed by the outboard flange of the barrel, an upper portion of the shoulder, and the circumferential portion of the bead lock face.

2. The bead-locking wheel of claim 1, wherein the inboard flange is configured to retain the inboard bead by way of outward force on the inboard flange by the inboard bead due to inflation pressure within an interior of the tire.

3. The bead-locking wheel of claim 1, wherein the shoulder is configured to retain the outboard bead ensuring that the outboard bead is concentric with the barrel.

4. The bead-locking wheel of claim 3, wherein the recess mechanically retains the outboard bead.

5. The bead-locking wheel of claim 4, wherein the recess is configured to facilitate an underinflated pressure within the tire.

6. The bead-locking wheel of claim 3, wherein the multiplicity of threaded holes of the shoulder are configured to receive a multiplicity of fasteners for securing the bead lock face to the barrel.

7. The bead-locking wheel of claim 6, wherein the multiple through-holes of the bead lock face are aligned with the multiplicity of threaded holes of the shoulder so that the multiplicity of fasteners passes through the multiple through-holes of the bead lock face.

8. The bead-locking wheel of claim 7, wherein the multiplicity of fasteners are configured to threadedly engage with the multiplicity of threaded holes for fastening the bead lock face to the barrel.

9. The bead-locking wheel of claim 1, wherein the bead lock face has a central opening configured to allow the wheel hub to protrude beyond the bead lock face.

10. The bead-locking wheel of claim 9, wherein the bead lock face comprises multiple stud-through holes disposed around the central opening and configured to receive studs from the wheel hub.

11. The bead-locking wheel of claim 10, wherein each of the multiple stud-through holes is configured to seat a lug nut for fastening the bead lock face to the wheel hub.

12. The bead-locking wheel of claim 1, wherein the central portion fits within the shoulder of the barrel.

13. A method for mounting a tire to a vehicle, the method comprises:
   providing a bead-locking wheel comprising:

a barrel for mounting a tire, the barrel of a cylindrical profile, a bead lock face for fastening the barrel to a wheel hub of a vehicle, the bead lock face of a disc-shaped planar profile having an inner face and an outer face, the bead lock face has a central portion and a circumferential portion, the central portion at the inner face is thicker than the circumferential portion and is of a cylindrical profile, wherein a side surface of the central portion and an inner surface of the circumferential portion form a right-angled step, the circumferential portion has multiple through-holes arranged radially and spaced apart from each other, an inboard flange of the barrel for retaining an inboard bead of the tire, an outboard flange of the barrel for retaining an outboard bead of the tire, a shoulder disposed around a circumference of the barrel, the shoulder disposed adjacent to the outboard flange, wherein a shape of the shoulder corresponds with a shape of the right-angled step so that the right-angled step juxtaposes with a side and a bottom portion of the shoulder, wherein the shoulder has a multiplicity of threaded holes, wherein positions of the multiplicity of threaded holes correspond to positions of the multiple through-holes of the circumferential portion, and a recess formed by the outboard flange of the barrel, an upper portion of the shoulder, and the circumferential portion of the bead lock face;

mounting the tire to the barrel, wherein the inboard bead of the tire contacts against the inboard flange of the barrel and the outboard bead of the tire contacts against the outboard flange of the barrel; and securing the bead lock face to the barrel, wherein the outboard bead of the tire is secured within the recesses.

14. The method of claim 13, further comprising inflating the tire to a desired internal pressure.

15. The method of claim 14, wherein inflating includes using an under-inflated pressure within the tire to accommodate off-road conditions and other conditions involving high tractive forces.

16. The method of claim 13, wherein securing the bead lock face comprises extending studs through stud through holes disposed in the bead lock face.

17. The method of claim 16, wherein securing the bead lock face includes tightening lug nuts onto the studs to fix the bead lock face to the wheel hub.

18. The method of claim 13, wherein the bead lock face is aligned with the barrel.

19. The method of claim 13, wherein the central portion fits within the shoulder of the barrel and the bead lock face has a central opening configured to allow the wheel hub to protrude beyond the bead lock face.

* * * * *